(12) United States Patent
Tsukada et al.

(10) Patent No.: US 9,296,413 B2
(45) Date of Patent: Mar. 29, 2016

(54) ELECTRIC POWER STEERING DEVICE

(71) Applicant: KAYABA INDUSTRY CO., LTD., Minato-ku, Tokyo (JP)

(72) Inventors: Yoshiyuki Tsukada, Gifu (JP); Shuhei Chiba, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/388,230

(22) PCT Filed: Mar. 18, 2013

(86) PCT No.: PCT/JP2013/057680
§ 371 (c)(1),
(2) Date: Sep. 25, 2014

(87) PCT Pub. No.: WO2013/146425
PCT Pub. Date: Oct. 3, 2013

(65) Prior Publication Data
US 2015/0034410 A1    Feb. 5, 2015

(30) Foreign Application Priority Data

Mar. 28, 2012 (JP) ................................. 2012-073932

(51) Int. Cl.
*B62D 5/04* (2006.01)
*B62D 6/10* (2006.01)
(Continued)

(52) U.S. Cl.
CPC ................ *B62D 5/0409* (2013.01); *B62D 1/16* (2013.01); *B62D 5/0403* (2013.01); *B62D 6/10* (2013.01); *G01L 3/101* (2013.01); *G01L 3/104* (2013.01); *G01L 3/109* (2013.01); *G01L 5/221* (2013.01)

(58) Field of Classification Search
CPC ...... B62D 5/0409; B62D 1/16; B62D 5/0403; B62D 6/10; G01L 3/101; G01L 3/104; G01L 3/109; G01L 5/221
USPC .............. 180/443, 444; 73/862.331, 862.332, 73/862.333, 862.334, 862.335, 862.336, 73/862.337, 862.338, 862.325
See application file for complete search history.

(56) References Cited

U.S. PATENT DOCUMENTS 6,705,422 B2 *  3/2004  Maekawa ....................... 180/444
7,380,474 B2 *  6/2008  Izumi .......................... 73/862.322
(Continued)

FOREIGN PATENT DOCUMENTS

CN    102112363 A    6/2011
EP    2243685 A2    10/2010
(Continued)

OTHER PUBLICATIONS

International Search Report and Written Opinion mailed May 7, 2013, corresponding to International application No. PCT/JP2013/057680.

*Primary Examiner* — Joseph Rocca
*Assistant Examiner* — Jacob Knutson
(74) *Attorney, Agent, or Firm* — Hauptman Ham, LLP

(57) ABSTRACT

An electric power steering device includes a steering shaft that is coupled to the steering wheel, an output shaft that is coupled to the steering shaft via a torsion bar, a torque sensor that detects a steering torque that acts on the torsion bar, a sensor case to which a magnetic material, which is a component of the torque sensor, is fixed, an upper column tube that rotatably supports the steering shaft, and a lower column tube that is movable relative to the upper column tube, wherein the lower column tube and the sensor case are configured as an integrated part made of a resin material.

4 Claims, 6 Drawing Sheets

(51) Int. Cl.
*G01L 3/10* (2006.01)
*B62D 1/16* (2006.01)
*G01L 5/22* (2006.01)

(56) References Cited

U.S. PATENT DOCUMENTS

| | | | |
|---|---|---|---|
| 8,825,301 B2 * | 9/2014 | Sugawara et al. | 701/42 |
| 2002/0029923 A1 * | 3/2002 | Tanioka | 180/444 |
| 2002/0059847 A1 | 5/2002 | Green et al. | |
| 2007/0240521 A1 * | 10/2007 | Osuka et al. | 73/862.326 |
| 2011/0120798 A1 | 5/2011 | Kawada et al. | |
| 2012/0073897 A1 * | 3/2012 | Ohnishi et al. | 180/443 |
| 2013/0180794 A1 * | 7/2013 | Shiino et al. | 180/444 |

FOREIGN PATENT DOCUMENTS

| | | |
|---|---|---|
| JP | 2002193115 A | 7/2002 |
| JP | 2009126440 A | 6/2009 |
| JP | 2010247790 A | 11/2010 |
| WO | 2011048846 A1 | 4/2011 |

* cited by examiner

2

ELECTRIC POWER STEERING DEVICE

TECHNICAL FIELD

The present invention relates to an electric power steering device.

BACKGROUND ART

JP2009-126440A discloses a conventional electric power steering device in which a sleeve made of resin is installed on the outer circumference of a lower column. This sleeve is provided to avoid stress concentration between the lower column and an upper column.

SUMMARY OF INVENTION

A slit is provided on the sleeve in the axial direction. This slit is provided such that the sleeve is easily installed on the outer circumference of the lower column and such that the sleeve is clamped between the lower column and the upper column. The lower column is press-fitted to a sensor case to which sensor parts of a torque sensor are attached. This press-fitting operation is performed such that the position of the slit of the sleeve installed on the lower column in the circumferential direction coincides with the specific position on the basis of a certain design concept. Thus, when the lower column is press-fitted to the sensor case, it is necessary to perform a phase management in the circumferential direction, causing the production cost to increase.

On the other hand, when sensor parts are attached to a metallic sensor case, it is necessary to form grooves for attachment to the sensor case, and it is necessary to perform a caulking process to fix the sensor parts to the inner circumferential surface of the sensor case in order to prevent the sensor parts from being rotated or detached. As described above, in order to attach sensor parts to a metallic sensor case, it is necessary to perform plurality of processes, causing the production cost to increase.

An object of the present invention is to reduce a production cost of an electric power steering device.

According to one aspect of the present invention, an electric power steering device that is configured to assist a steering force applied to a steering wheel by a driver with a rotation torque from an electric motor is provided. The electric power steering device comprises a steering shaft that is coupled to the steering wheel, an output shaft that is coupled to the steering shaft via a torsion bar, a torque sensor that detects a steering torque that acts on the torsion bar, a sensor case to which a magnetic material, which is a component of the torque sensor, is fixed, an upper column tube that rotatably supports the steering shaft, and a lower column tube that is movable relative to the upper column tube, wherein the lower column tube and the sensor case are configured as an integrated part made of a resin material.

Embodiments of the present invention and advantages thereof are described in detail below with reference to the accompanying drawings.

DESCRIPTION OF EMBODIMENT

An electric power steering device 100 according to an embodiment of the present invention will be described with reference to the drawings.

Figure 1:
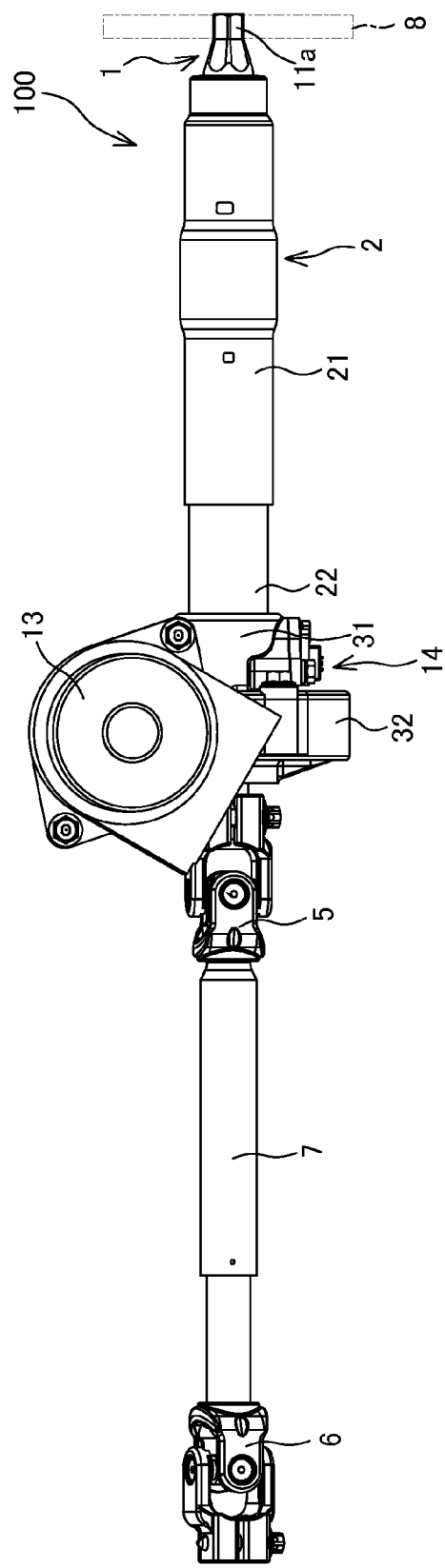
FIG. 1 is a side view of an electric power steering device according to an embodiment of the present invention.
Figure 2:
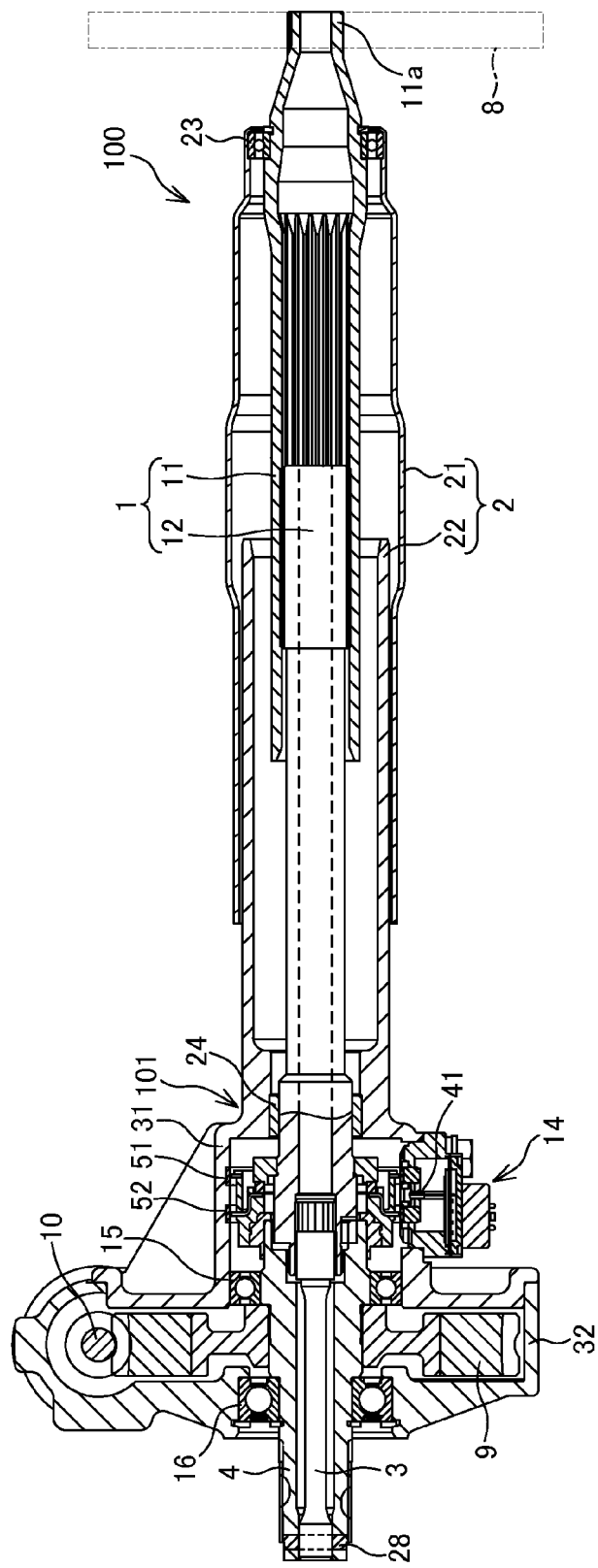
FIG. 2 is a sectional view of the electric power steering device according to the embodiment of the present invention.

An overall configuration of the electric power steering device 100 will be first described with reference to FIGS. 1 and 2.

The electric power steering device 100 is a device that assists a steering force applied to a steering wheel 8 by a driver with a rotation torque from an electric motor 13.

The electric power steering device 100 includes a steering shaft 1 that is coupled to the steering wheel 8, a steering column 2 that rotatably supports the steering shaft 1 that is inserted into the interior thereof, and an output shaft 4 that is coupled to the steering shaft 1 via a torsion bar 3.

The output shaft 4 is coupled to wheels via universal joints 5 and 6, a counter shaft 7, a pinion, a rack, and so forth. As a driver steers the steering wheel 8, the rack moves in the axial direction to change the directions of the wheels. In the following description, the steering wheel 8 side and the wheels side are described as the upper side and the lower side, respectively.

The electric power steering device 100 includes an assist mechanism that assists the steering force applied to the steering wheel 8 by a driver. The assist mechanism includes a worm wheel 9 that is coupled to the output shaft 4, a worm shaft 10 that is engaged with the worm wheel 9, the electric motor 13 that drives the worm shaft 10 to rotate, a torque sensor 14 that detects steering torque acting on the torsion bar 3, and a controller that controls driving of the electric motor 13 on the basis of the detected result from the torque sensor 14. The rotation torque output from the electric motor 13 is transmitted to the worm wheel 9 from the worm shaft 10 and applied to the output shaft 4 as auxiliary torque. The rotation torque to be output from the electric motor 13 is calculated on the basis of the steering torque detected with the torque sensor 14.

The torque sensor 14 is housed in a sensor case 31, and the worm wheel 9 and the worm shaft 10 are housed in a gear case 32. The sensor case 31 and the gear case 32 are fastened by bolts. The gear case 32 is supported by a vehicle body via a bracket (not shown).

The steering shaft 1 includes an upper shaft 11 having a substantially cylindrical shape, in which the steering wheel 8 is coupled to an upper end portion 11a thereof, and a lower shaft 12 having a substantially cylindrical shape, in which the upper shaft 11 is connected coaxially and the torsion bar 3 is coupled to a lower end portion thereof. The upper portion side of the lower shaft 12 is inserted into a hollow part of the upper shaft 11 such that both shafts are connected via serrated portions. With such a connection via the serrated portions, the upper shaft 11 and the lower shaft 12 can be rotated integrally and, at the same time, can be moved relatively in the axial direction. A bearing 24 is interposed between the lower portion side of the lower shaft 12 and an inner circumferential surface of the sensor case 31.

The steering column 2 includes an upper column tube 21 having a substantially cylindrical shape that rotatably supports the upper shaft 11 via a bearing 23 and a lower column tube 22 having a substantially cylindrical shape that is arranged coaxially with the upper column tube 21. The upper portion side of the lower column tube 22 is inserted into the lower portion side of the upper column tube 21 such that both tubes can be moved relatively in the axial direction. Relative movement of the upper shaft 11 and the upper column tube 21 in the axial direction is restricted by the bearing 23. The lower column tube 22 and the sensor case 31 are configured as an integrated part made of a resin material. The detail of the configuration will be described later.

The upper column tube 21 is supported by a vehicle body via a column bracket (not shown) so as to be movable in the axial direction. Thus, the steering wheel 8 can be moved in the front-to-rear direction viewed from a driver.

The output shaft 4 is rotatably supported onto the sensor case 31 and the gear case 32 via bearings 15 and 16, respectively. The output shaft 4 has a cylindrical shape, and the torsion bar 3 is inserted into its hollow part.

The upper end portion of the torsion bar 3 projects out from the upper-end opening portion of the output shaft 4 and is coupled to the lower end portion of the lower shaft 12 via a serration. The lower end portion of the torsion bar 3 is coupled to the lower end portion of the output shaft 4 via a pin 28. The lower shaft 12 and the output shaft 4 are coupled coaxially via the torsion bar 3. The torsion bar 3 transmits steering torque input into the steering shaft 1 via the steering wheel 8 to the output shaft 4, and undergoes torsional deformation about the axial center in accordance with the steering torque.

Figure 3:
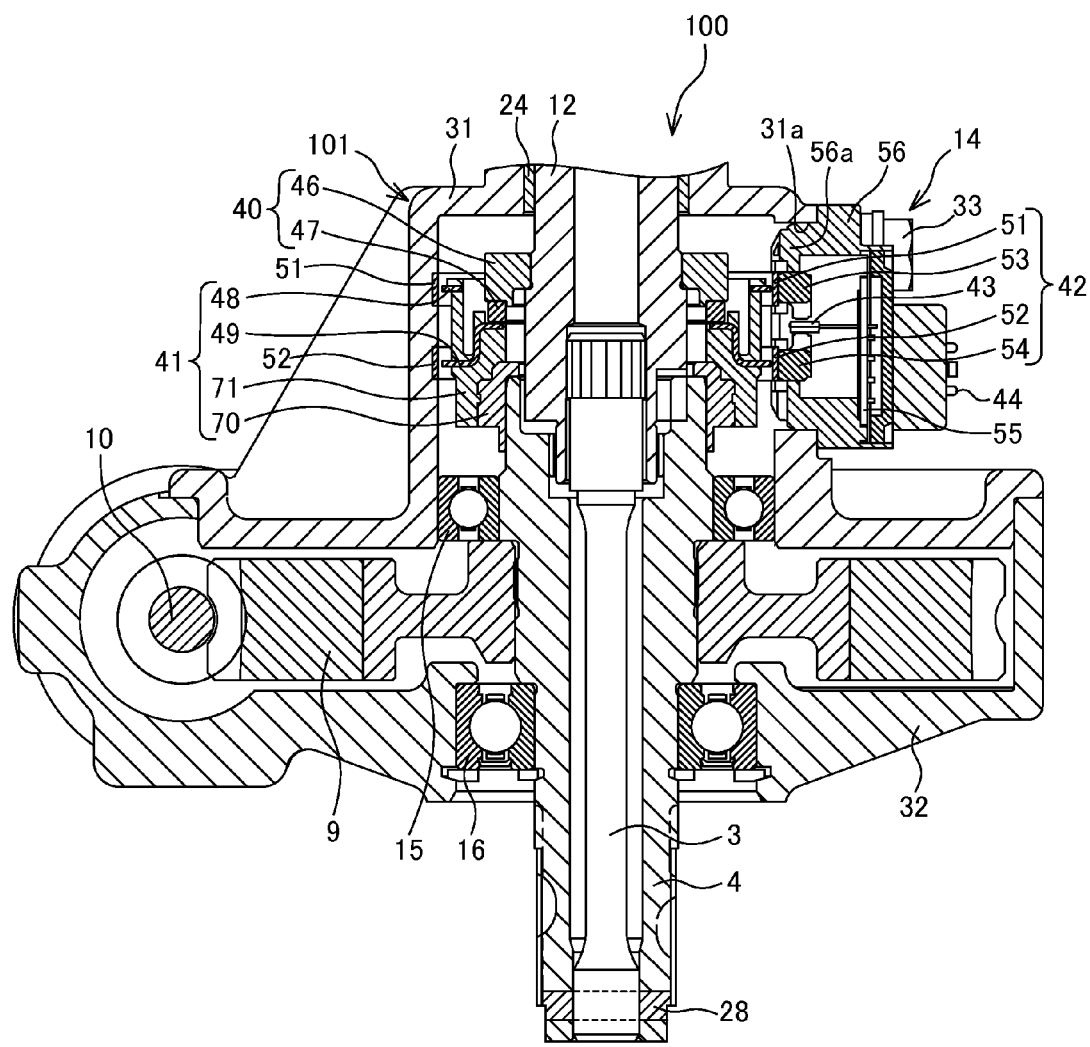
FIG. 3 is a partially enlarged view of FIG. 2.
Figure 4:
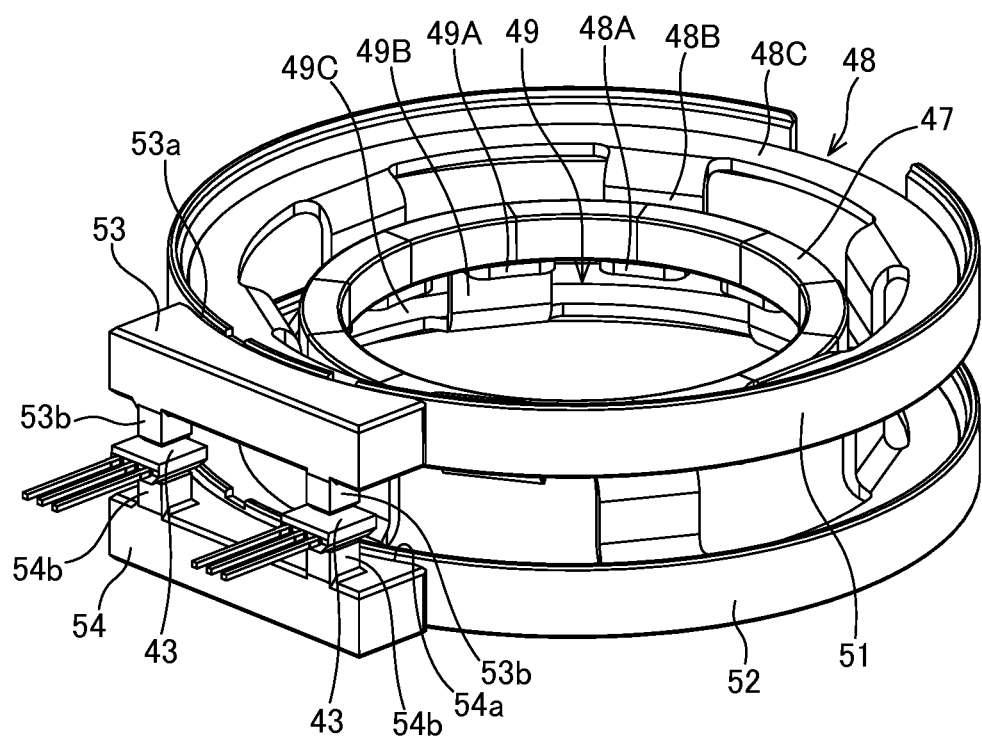
FIG. 4 is a perspective view of a ring magnet, a rotating magnetic circuit portion, a fixed magnetic circuit portion, and magnetism sensors.

The torque sensor 14 detects the steering torque acting on the torsion bar 3 on the basis of magnetic flux density that changes in accordance with a degree of the torsional deformation of the torsion bar 3. The torque sensor 14 will be described below with reference to FIGS. 3 and 4.

The torque sensor 14 includes a magnetism generating portion 40 that is fixed to the lower shaft 12 so as to rotate together with the lower shaft 12, a rotating magnetic circuit portion 41 that is fixed to the output shaft 4 so as to rotate together with the output shaft 4, a fixed magnetic circuit portion 42 that is fixed to the sensor case 31, and magnetism sensors 43 serving as a magnetism detector that detect a magnetic flux density guided from the magnetism generating portion 40 to the fixed magnetic circuit portion 42 through the rotating magnetic circuit portion 41 in accordance with the torsional deformation of the torsion bar 3. The torque sensor 14 detects the steering torque acting on the torsion bar 3 on the basis of an output from the magnetism sensors 43.

Instead of the configuration described above, the magnetism generating portion 40 may be fixed to the output shaft 4 so as to rotate together with the output shaft 4, and the rotating magnetic circuit portion 41 may be fixed to the lower shaft 12 so as to rotate together with the lower shaft 12.

The magnetism generating portion 40 includes an annular back yoke 46 that is press-fitted to the lower shaft 12 and an annular ring magnet 47 that is connected to the lower end surface of the back yoke 46. The ring magnet 47 is a permanent magnet that has a plurality of magnetic poles formed at equal widths in a circumferential direction, and has N poles and S poles that are arranged alternately in the circumferential direction.

The rotating magnetic circuit portion 41 includes a first soft magnetic ring 48 and a second soft magnetic ring 49 to which magnetic flux generated by the ring magnet 47 of the magnetism generating portion 40 is guided, an attachment member 70 that is attached to the output shaft 4, and a molded resin 71 that fixes the first soft magnetic ring 48 and the second soft magnetic ring 49 to the attachment member 70.

The first soft magnetic ring 48 includes an annular first magnetic path ring portion 48C, six first magnetic path column portions 48B that project downward from the first magnetic path ring portion 48C, and first magnetic path tip-end portions 48A that are bent inward from lower ends of the respective first magnetic path column portions 48B so as to face the lower end surface of the ring magnet 47. The second soft magnetic ring 49 includes an annular second magnetic path ring portion 49C, six second magnetic path column portions 49B that project upward from the second magnetic path ring portion 49C, and second magnetic path tip-end portions 49A that are bent inward from upper ends of the respective second magnetic path column portions 49B so as to face the lower end surface of the ring magnet 47.

The first magnetic path tip-end portions 48A and the second magnetic path tip-end portions 49A are formed in a flat plate shape. The first magnetic path tip-end portions 48A and the second magnetic path tip-end portions 49A are arranged alternately at equal intervals in the circumferential direction about the rotary axis of the torsion bar 3 on the identical plane that is orthogonal to the rotary axis.

Furthermore, the first magnetic path tip-end portions 48A and the second magnetic path tip-end portions 49A are arranged such that, in a neutral condition where no torque acts on the torsion bar 3, the center lines extending respectively in the radial direction of the torsion bar 3 denote boundaries between the N poles and the S poles of the ring magnet 47.

The fixed magnetic circuit portion 42 includes a first magnetism collecting ring 51 that is provided along the outer circumference of the first magnetic path ring portion 48C of the first soft magnetic ring 48, a second magnetism collecting ring 52 that is provided along the outer circumference of the second magnetic path ring portion 49C of the second soft magnetic ring 49, a first magnetism collecting yoke 53 that is connected to the first magnetism collecting ring 51, and a second magnetism collecting yoke 54 that is connected to the second magnetism collecting ring 52. The first and second magnetism collecting rings 51 and 52 and the first and second magnetism collecting yokes 53 and 54 are formed of a soft magnetic material.

The first magnetism collecting ring 51 and the second magnetism collecting ring 52 are formed in a C shape having a slit in a part thereof and are fixed to the inner circumferential surface of the sensor case 31. The inner circumferential surface of the first magnetism collecting ring 51 faces the first magnetic path ring portion 48C of the first soft magnetic ring 48, and the inner circumferential surface of the second magnetism collecting ring 52 faces the second magnetic path ring portion 49C of the second soft magnetic ring 49.

As described above, the first magnetism collecting ring 51 and the second magnetism collecting ring 52 are arranged on the outer circumference of the rotating magnetic circuit portion 41 so as to guide magnetic flux to the magnetism sensors 43 side while reducing effects of rotation fluctuation and eccentricity in the rotating magnetic circuit portion 41.

The first magnetism collecting yoke 53 is formed in a block shape having an arc-shaped inner circumferential surface 53a that is in contact with the outer circumferential surface of the first magnetism collecting ring 51, and the second magnetism collecting yoke 54 is formed in a block shape having an arc-shaped inner circumferential surface 54a that is in contact with the outer circumferential surface of the second magnetism collecting ring 52.

A pair of magnetic flux collecting projecting portions 53b are provided on the first magnetism collecting yoke 53 in an extended manner, and a pair of magnetic flux collecting projecting portions 54b are provided on the second magnetism collecting yoke 54 in an extended manner, such that the magnetic flux collecting projecting portions 53b and the magnetic flux collecting projecting portions 54b respectively oppose each other via predetermined gaps serving as magnetic gaps. The magnetism sensors 43 are disposed in the magnetic gaps, respectively.

The first magnetism collecting yoke 53 and the second magnetism collecting yoke 54 have a function to collect magnetic flux from the rotating magnetic circuit portion 41 to the magnetism sensors 43 via the first magnetism collecting ring 51 and the second magnetism collecting ring 52.

The first magnetism collecting yoke 53, the second magnetism collecting yoke 54, the magnetism sensors 43, and a substrate 55 are fixed to a resin sensor holder 56 via molded resin. A cylindrical portion 56a of the sensor holder 56 is fitted into an opening portion 31a of the sensor case 31, and the sensor holder 56 is attached to the sensor case 31 by a bolt 33.

The magnetism sensors 43 output a voltage corresponding to a magnitude and a direction of a magnetic field in the magnetic gap via the substrate 55 and a terminal 44. The terminal 44 is connected to a controller via a wire connected to the sensor holder 56.

Next, a method of detecting the steering torque acting on the torsion bar 3 using the torque sensor 14 will be described.

In the neutral condition where no torque acts on the torsion bar 3, the first magnetic path tip-end portions 48A of the first soft magnetic ring 48 and the second magnetic path tip-end portions 49A of the second soft magnetic ring 49 respectively face the N poles and the S poles of the ring magnet 47 by an identical surface area so as to be magnetically short-circuited. As a result, no magnetic flux is guided to the rotating magnetic circuit portion 41 and the fixed magnetic circuit portion 42.

When torque in a specific direction is exerted on the torsion bar 3 in response to an operation of the steering wheel 8 by a driver, the torsion bar 3 undergoes torsional deformation in accordance with the direction of the torque. When the torsion bar 3 undergoes torsional deformation, the first magnetic path tip-end portions 48A face the N poles by a greater surface area than the S poles, while the second magnetic path tip-end portions 49A face the S poles by a greater surface area than the N poles. Accordingly, the magnetic flux from the ring magnet 47 is guided to the fixed magnetic circuit portion 42 through the rotating magnetic circuit portion 41. More specifically, a resulting magnetic path extends from the N pole to the S pole via the first soft magnetic ring 48, the first magnetism collecting ring 51, the first magnetism collecting yoke 53, the second magnetism collecting yoke 54, the second magnetism collecting ring 52, and the second soft magnetic ring 49. The magnetism sensors 43 disposed in the magnetic gaps between the first magnetism collecting yoke 53 and the second magnetism collecting yoke 54 output signals corresponding to the magnitude and the direction of the magnetic flux.

When torque is exerted on the torsion bar 3 in the opposite direction to the above direction in response to an operation of the steering wheel 8 by the driver, the torsion bar 3 undergoes torsional deformation in an opposite direction in accordance with the direction of the torque. When the torsion bar 3 undergoes torsional deformation, the first magnetic path tip-end portions 48A face the S poles by a greater surface area than the N poles, while the second magnetic path tip-end portions 49A face the N poles by a greater surface area than the S poles. Accordingly, the magnetic flux from the ring magnet 47 is guided to the fixed magnetic circuit portion 42 through the rotating magnetic circuit portion 41 along an opposite path to that described above. More specifically, the magnetic path extends from the N pole to the S pole via the second soft magnetic ring 49, the second magnetism collecting ring 52, the second magnetism collecting yoke 54, the first magnetism collecting yoke 53, the first magnetism collecting ring 51, and the first soft magnetic ring 48. The magnetism sensors 43 disposed in the magnetic gaps between the first magnetism collecting yoke 53 and the second magnetism collecting yoke 54 output signals corresponding to the magnitude and the direction of the magnetic flux.

The magnetic flux guided to the magnetic gaps increases as a surface area difference by which the first magnetic path tip-end portions 48A face the N poles and the S poles of the ring magnet 47 and a surface area difference by which the second magnetic path tip-end portions 49A face the N poles and the S poles of the ring magnet 47 increase, and as a result, the output signals from the magnetism sensors 43 also increase.

As described above, the lower column tube 22 and the sensor case 31 are configured as an integrated part made of a resin material. The configuration will be described below in detail mainly with reference to FIGS. 5 to 7.

Figure 5:
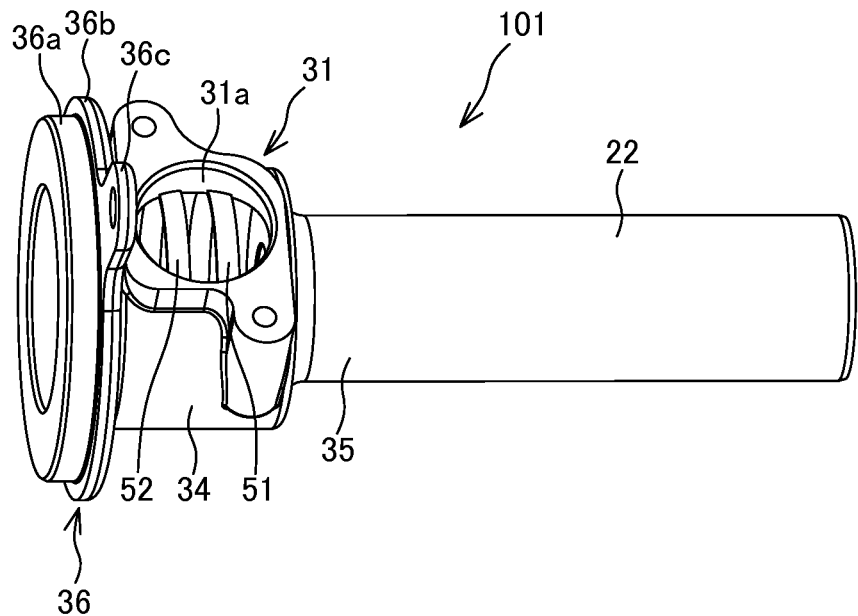
FIG. 5 is a perspective view of a resin molded body.
Figure 6:
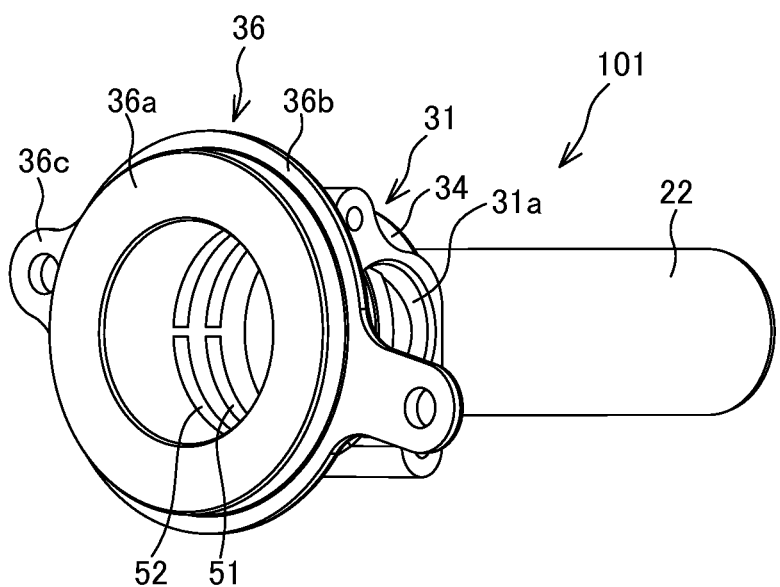
FIG. 6 is a perspective view of the resin molded body.
Figure 7:
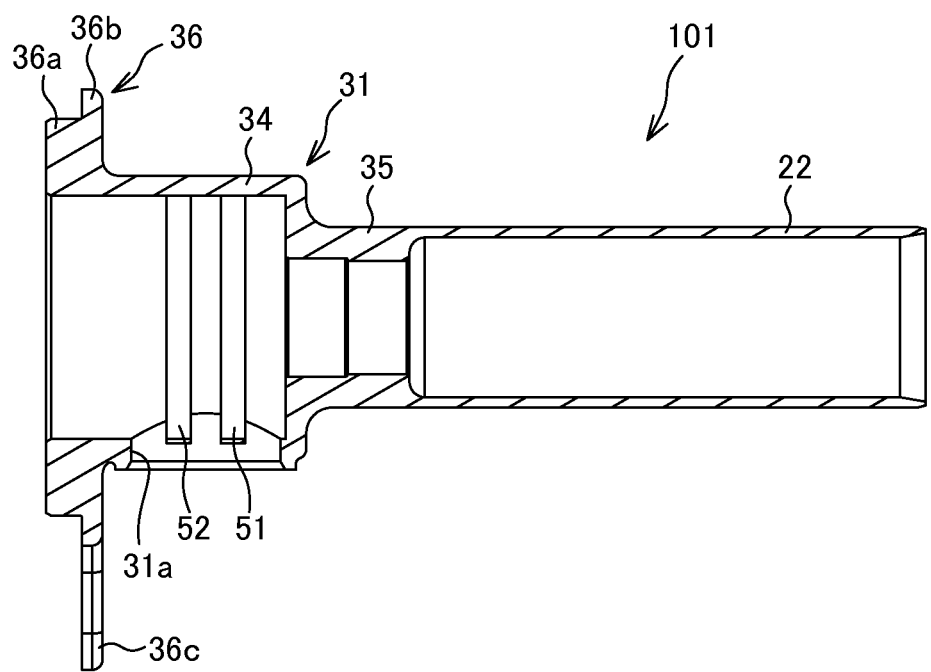
FIG. 7 is a sectional view of the resin molded body.

The first magnetism collecting ring 51 and the second magnetism collecting ring 52, each of which is one of the components of the torque sensor 14, are integrally molded with the lower column tube 22 and the sensor case 31 by an insert molding so as to be configured as a resin molded body 101. FIGS. 5 and 6 are perspective views of the resin molded body 101, and FIG. 7 is a sectional view of the resin molded body 101.

The sensor case 31 includes a large-diameter portion 34 that has an opening portion 31a into which the cylindrical portion 56a of the sensor holder 56 is fitted, a small-diameter portion 35 that supports the lower shaft 12 via the slide bearing 24 (see FIGS. 2 and 3), and a lid body 36 that closes an opening portion of the gear case 32. The lid body 36 has a spigot joint portion 36a that fits into the opening portion of the gear case 32, an annular flange portion 36b that is in contact with an end surface of the gear case 32, and a fastener portion 36c that is formed so as to project from the outer circumferential surface of the flange portion 36b and that is fastened to the gear case 32.

The lower column tube 22 is formed integrally with the small-diameter portion 35 of the sensor case 31. The first magnetism collecting ring 51 and the second magnetism collecting ring 52 are fixed to the inner circumferential surface of the large-diameter portion 34 of the sensor case 31.

By integrally configuring the lower column tube 22, the sensor case 31, the first magnetism collecting ring 51, and the second magnetism collecting ring 52 as the resin molded body 101, the following advantages are afforded.

(1) Because the lower column tube 22 is made of a resin material, a sleeve, which is required, if the lower column tube 22 is made of metal, for improving a sliding property between the upper column tube 21 and the lower column tube 22, needs not be installed on the outer circumference of the lower column tube 22. In other words, it is possible to reduce the number of parts. Furthermore, because it is possible to omit the sleeve, it is not necessary to perform a phase management for adjusting in the circumferential direction the position of a slit of the sleeve to a specific position, which has conventionally been performed when the lower column tube 22 is press-fitted to the sensor case 31.

(2) Because the lower column tube 22 and the sensor case 31 are configured as an integrated part made of a resin material, it is not necessary to perform an operation of press-fitting the lower column tube 22 to the sensor case 31, which has conventionally been required.

(3) Conventionally, the lower column tube 22 is made of a steel material, and the sensor case 31 is made of an aluminum material. Therefore, it is necessary to design dimensions etc. of the lower column tube 22 and the sensor case 31 in consideration of the difference between the coefficients of thermal expansion of both materials. However, because the lower column tube 22 and the sensor case 31 are configured as an integrated part made of a resin material, the coefficient of thermal expansion needs not be considered.

(4) Because the first magnetism collecting ring 51 and the second magnetism collecting ring 52 are embedded into and fixed to the inner circumferential surface of the large-diameter portion 34 of the sensor case 31 by insert molding, grooving process for fixing the first magnetism collecting ring 51 and the second magnetism collecting ring 52 needs not be performed on the inner circumferential surface of the sensor case 31. Furthermore, caulking process for fixing the first magnetism collecting ring 51 and the second magnetism collecting ring 52 to the inner circumferential surface of the sensor case 31 also needs not be performed.

(5) With the conventional method in which the first magnetism collecting ring 51 and the second magnetism collecting ring 52 are fitted to grooves formed on the inner circumferential surface of the sensor case 31 and fixed by caulking process, there has been a risk that the first magnetism collecting ring 51 or the second magnetism collecting ring 52 may be rotated or detached due to variations in surrounding temperature and caulking failure. However, because the first magnetism collecting ring 51 and the second magnetism collecting ring 52 are fixed to the sensor case 31 by insert molding, the first magnetism collecting ring 51 and the second magnetism collecting ring 52 are prevented from being rotated or detached, and reliability of the torque sensor 14 is enhanced.

As described above, by configuring the lower column tube 22, the sensor case 31, the first magnetism collecting ring 51, and the second magnetism collecting ring 52 as the resin molded body 101 in an integrated manner, it is possible to reduce the production cost of the electric power steering device 100. Furthermore, because the lower column tube 22 and the sensor case 31 are formed of a resin material, it is possible to reduce the weight of the electric power steering device 100.

Embodiments of this invention were described above, but the above embodiments are merely examples of applications of this invention, and the technical scope of this invention is not limited to the specific constitutions of the above embodiments.

This application claims priority based on Japanese Patent Application No. 2012-073932 filed with the Japan Patent Office on Mar. 28, 2012, the entire contents of which are incorporated into this specification.

The invention claimed is:
1. An electric power steering device that is configured to assist a steering force applied to a steering wheel by a driver with a rotation torque from an electric motor, the electric power steering device comprising:
a steering shaft that is coupled to the steering wheel;
an output shaft coupled to the steering shaft via a torsion bar;
a torque sensor configured to detect a steering torque scting on the torsion bar, the torque sensor comprising a magnetic material;
a sensor case to which the magnetic material is fixed;
an upper column tube that rotatably supports the steering shaft;
a lower column tube that is movable relative to the upper column tube; and a resin molded body comprising both the lower column tube and the sensor case, wherein
the lower column tube and the sensor case are made of a resin material,
the lower column tube is formed integrally with the sensor case, and the resin material in the resin molded body extends continuously from the lower column tube to the sensor case.

2. The electric power steering device according to claim 1, wherein
the magnetic material is insert molded with the lower column tube and the sensor case.

3. The electric power steering device according to claim 1, wherein the torque sensor further comprises:
a magnetism generating portion configured to rotate together with one of the steering shaft and the output shaft;
a rotating magnetic circuit portion configured to rotate together with the other of the steering shaft and the output shaft;
a fixed magnetic circuit portion fixed to the sensor case and comprising the magnetic material; and
a magnetism detector configured to detect magnetic flux density guided from the magnetism generating portion to the fixed magnetic circuit portion through the rotating magnetic circuit portion in accordance with a torsional deformation of the torsion bar.

4. The electric power steering device according to claim 3, wherein
the rotating magnetic circuit portion comprises a first soft magnetic ring and a second soft magnetic ring to which magnetic flux generated by the magnetism generating portion in accordance with the torsional deformation of the torsion bar is guided; and
the magnetic material is a first magnetism collecting ring and a second magnetism collecting ring that are provided along respective outer circumferences of the first soft magnetic ring and the second soft magnetic ring and fixed to an inner circumferential surface of the sensor case.

* * * * *